US010776011B2

(12) United States Patent
Chen et al.

(10) Patent No.: US 10,776,011 B2
(45) Date of Patent: *Sep. 15, 2020

(54) SYSTEM AND METHOD FOR ACCESSING A STORAGE DEVICE

(71) Applicant: RayMX Microelectronics, Corp., Anhui province (CN)

(72) Inventors: Cheng-Yu Chen, New Taipei (TW); Chih-Ching Chien, Hsinchu County (TW); Yen-Chung Chen, Hsinchu County (TW)

(73) Assignee: RAYMX MICROELECTRONICS CORP., Hefei, Anhui Province (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/293,770

(22) Filed: Mar. 6, 2019

(65) Prior Publication Data
US 2019/0196714 A1 Jun. 27, 2019

Related U.S. Application Data

(63) Continuation of application No. 15/598,307, filed on May 17, 2017, now Pat. No. 10,235,050.

(30) Foreign Application Priority Data
May 18, 2016 (TW) .............................. 105115358 A

(51) Int. Cl.
*G06F 3/00* (2006.01)
*G06F 3/06* (2006.01)
*G06F 13/42* (2006.01)

(52) U.S. Cl.
CPC ............ *G06F 3/061* (2013.01); *G06F 3/0604* (2013.01); *G06F 3/0659* (2013.01);
(Continued)

(58) Field of Classification Search
CPC .............................. G06F 3/061; G06F 3/0604
(Continued)

(56) References Cited

U.S. PATENT DOCUMENTS

| 7,921,178 B2 * | 4/2011 | Haviv ................... G06F 3/0613 709/212 |
| 2003/0191916 A1 * | 10/2003 | McBrearty .......... G06F 11/1464 711/162 |
| 2012/0239849 A1 * | 9/2012 | Brahmaroutu ...... G06F 11/1084 710/313 |

FOREIGN PATENT DOCUMENTS

| CN | 101149664 A | 3/2008 |
| TW | 201612736 A | 4/2016 |

OTHER PUBLICATIONS

CN Office Action dated Sep. 2, 2019 in Chinese application No. 201610351395.9.

* cited by examiner

*Primary Examiner* — Jae U Yu
(74) *Attorney, Agent, or Firm* — McClure, Qualey & Rodack, LLP

(57) ABSTRACT

A computing system including a memory, a processor and a solid state disk is provided. The memory stores a disk access driver program. The solid state disk includes a storage circuit and a control circuit. The control circuit includes a processing unit, a first access path and a second access path. The processing unit communicates with the processor through the first access path. The processor executes the driver program that enables the processor to process a disk access command for directly accessing the storage circuit of the solid state disk through the second access path.

16 Claims, 3 Drawing Sheets

(52) U.S. Cl.
CPC ........ *G06F 3/0679* (2013.01); *G06F 13/4282* (2013.01); *G06F 2213/0026* (2013.01)

(58) Field of Classification Search
USPC .......................................................... 711/103
See application file for complete search history.

SYSTEM AND METHOD FOR ACCESSING A STORAGE DEVICE

RELATED APPLICATIONS

This application is a continuation of U.S. application Ser. No. 15/598,307, filed on May 17, 2017, now patented as U.S. Pat. No. 10,235,050, which claims priority to Taiwan Application Serial Number 105115358, filed May 18, 2016, which is herein incorporated by reference.

BACKGROUND

Field of Disclosure

The present disclosure relates to disk access technologies. More particularly, the present disclosure relates to a computer system and a disk access method of the same.

Description of Related Art

Compared to traditional magnetic storage media such as hard disk drives (HDD), solid state disks (SSD) have the advantages of high data access speed, small size and better resistivity to impact. However, a solid state disk requires a controller that is embedded therein to bridge memory components to a host computer and that processes disk access commands. As the solid state disks become progressively larger in storage size and thus the complexity of the memory addresses management increases, a more powerful controller or an increase in the number of cores in the controller is required to enhance the processing power of the solid state disks in order to keep up with the increased complexity. However, the cost of the solid state disk greatly increases when a more powerful controller or a greater number of cores therein is used.

Accordingly, a computer system and a disk access method of the same are needed to address the above issues.

SUMMARY

An aspect of the present disclosure is to provide a system. The system includes a memory, a processor and a solid state disk. The memory is configured to store a disk access driver program. The solid state disk includes a storage circuit and a control circuit. The control circuit includes a processing unit. The processor is configured to execute the driver program that enables the processor to process a disk access command for directly accessing the storage circuit of the solid state disk through the second access path.

Another aspect of the present disclosure is to provide a method. Communication is performed with a processor through a first access path of a solid state disk by a processing unit of the solid state disk. A driver program stored in a memory is executed and a disk access command is processed by the processor. A storage circuit of the solid state disk is accessed through a second access path by the processor.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

In order to make the objects, technical solutions and advantages of the present disclosure apparent, diagrams in combination of examples are used to describe the present disclosure in further detail. It should be understood that the specific embodiments described herein are merely examples for explaining the present disclosure and are not intended to limit the present disclosure.

Figure 1:
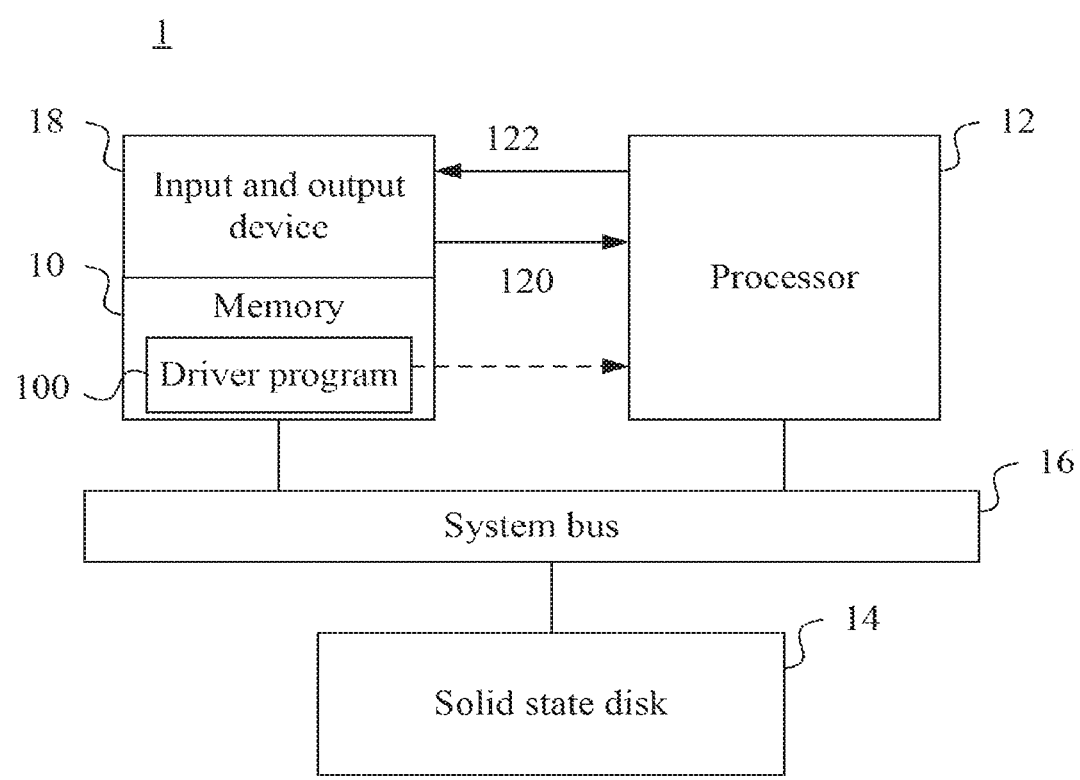
FIG. 1 is a block diagram of a computing system in an embodiment of the present disclosure.

FIG. 1 is a block diagram of a computing system 1 in an embodiment of the present disclosure. The computing system 1 includes a memory 10, a processor 12 and a solid state disk 14. The computing system 1 can be, for example, a desktop, a notebook computer, a cellular device, a server in a datacenter, an automated vehicle, or various kinds of electronic devices that requires SSD, but is not limited thereto.

The memory 10 can be any storage device used to store data. The memory 10 may include, for example, a read-only memory, a flash memory, a floppy disk, a hard disk, a CD, a flash drive, magnetic tape, a database accessible by the Internet, or another type of memory, and is not limited in this regard. In an embodiment, the processor 12 accesses and executes the program stored in the memory 10 to accomplish the desired function.

In an embodiment, the solid state disk 14 and the processor 12 are coupled through a system bus 16 to perform data transmission therebetween. In an embodiment, the system bus 16 is a peripheral component interconnect express (PCIe) bus. In practice, the computing system 1 may further include other devices that are coupled to the processor 12 through the system bus 16, such as a south bridge chip, a display card, a network card, a CD player or other devices (not illustrated), and is not limited in this regard.

In an embodiment, the computing system 1 further includes an input and output device 18. In practice, the input and output device 18 can be a combination of a plurality of input and output components, such as a combination of a keyboard, a mouse, a display and a touch display (not illustrated), but is not limited in this regard.

In an embodiment, the memory 10 described above stores a driver program 100. The processor 12 can access and execute the driver program 100. For example, when the computing system 1 is initialized, the driver program 100 stored in the hard disk can be loaded to the system memory, e.g., random access memory, to be accessed and executed by the processor 12.

The processor 12 processes a disk access command 120 by executing the driver program 100 to access the solid state disk 14. In an embodiment, the disk access command 120 is generated by, for example, the input and output device 18 by receiving the input from a user, but the present disclosure is not limited in this regard. Further, after accessing the solid state disk 14, the processor 12 can generate a response message 122 and transmit the same to the input and output device 18 to, for example, generate a frame on the display to notify the user, but the present disclosure is not limited in this regard.

The architecture of the solid state disk 14, and the operation of the solid state disk 14 and the processor 12 are described in detail in the following paragraphs.

Figure 2:
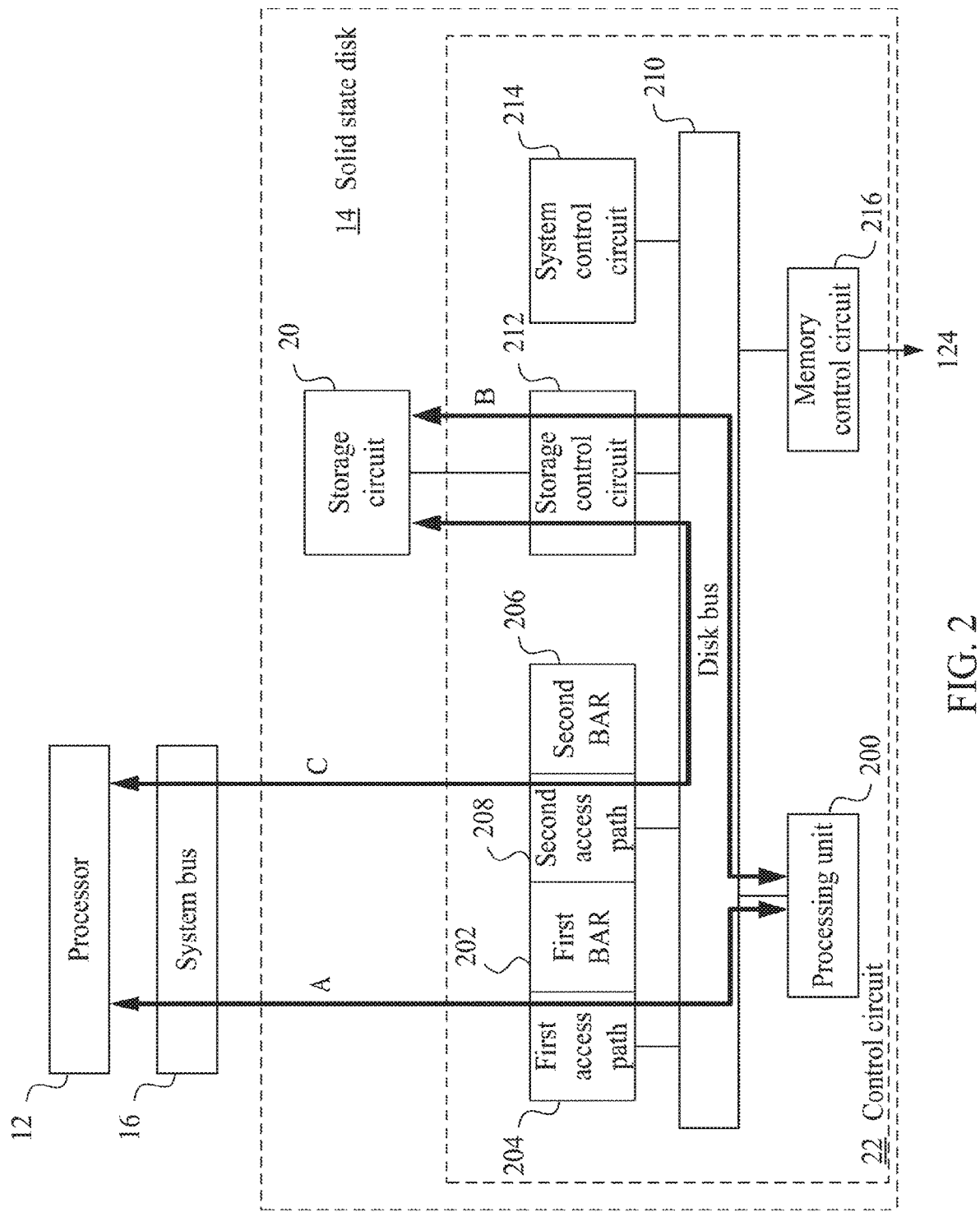
FIG. 2 is a detailed block diagram of a processor, a solid state disk and a system bus in FIG. 1 in an embodiment of the present invention.

Additional reference is now made to FIG. 2. FIG. 2 is a detailed block diagram of the processor 12, the solid state disk 14 and the system bus 16 in FIG. 1 in an embodiment of the present invention. The solid state disk 14 includes a storage circuit 20 and a control circuit 22. In an embodiment, the storage circuit 20 is a flash memory configured to store data.

The control circuit 22 includes a processing unit 200, a first base address register 202, a first access path 204, a second base address register 206 and a second access path 208.

In an embodiment, the control circuit 22 further includes a disk bus 210. The processing unit 200, the first access path 204 and the second access path 208 are coupled to the disk bus 210. Thus, the components in the control circuit 22 can communicate with each other through the disk bus 210.

In an embodiment, the control circuit 22 further includes a storage control circuit 212 coupled between the storage circuit 20 and the disk bus 210. Any action to access the storage circuit 20 is performed through the storage control circuit 212.

The first base address register 202 is configured to store a first device memory address, and the second base address register 206 is configured to store a second device memory address. In an embodiment, each of the first and the second device memory addresses is assigned to correspond to a section of input/output memory block of the memory 10 by the computing system 1 when the solid state disk 14 is initialized. The addresses of such sections of the memory block are stored in the first base address register 202 and the second base address register 206. When the processor 12 accesses the first and the second device memory addresses in the memory 10, the processor 12 actually accesses the solid state disk 14.

In an embodiment, each of the first access path 204 and the second access path 208 is a direct memory access (DMA) path, and the first access path 204 and the second access path 208 correspond to the first base address register 202 and the second base address register 206 respectively. Though the solid state disk 14 is actually a single device, the processor 12 treats the solid state disk 14 as two different devices since the memory addresses stored in the first base address register 202 and the second base address register 206 are different. The processor 12 communicates with the solid state disk 14 through each of the first access path 204 and the second access path 208.

The processing unit 200 communicates with the processor 12 through the first access path 204. More specifically, the processing unit 200 communicates with the processor 12 through a path A illustrated in FIG. 2 that includes the disk bus 210, the first access path 204 and the system bus 16. Moreover, the processing unit 200 accesses the storage circuit 20 of the solid state disk 14 through a path B illustrated in FIG. 2 that includes the disk bus 210 and the storage control circuit 212.

After being executed by the processor 12, the driver program 100 enables the processor 12 to act as a virtual operation core to process the disk access command 120 to directly access the storage circuit 20 of the solid state disk 14 through the second access path 208. More specifically, the processor 12 accesses the storage circuit 20 through a path C illustrated in FIG. 2 that includes the system bus 16, the second access path 208, the disk bus 210 and the storage control circuit 212. For the path C, the disk access command 120 is processed and computed by the processor 12 independently. The storage circuit 20 of the solid state disk 14 is directly accessed by the processor 12 without using the processing unit 200, or without substantially using the processing unit 200.

As a result, in an embodiment, the driver program 100 executed by the processor 12 can coordinate and operate together with the processing unit 200 to access, monitor and manage the solid state disk 14.

When the solid state disk 14 is accessed, the driver program 100 executed by the processor 12 and the processing unit 200 share the loading to process the disk access command 120. Under such a condition, the processor 12 accesses the storage circuit 20 through the first access path 204 and the second access path 208 simultaneously. In other words, the processor 12 accesses the storage circuit 20 through the path A and the path B by using the processing unit 200, and accesses the storage circuit 20 through the path C by using the driver program 100.

It should be noted that when the processor 12 accesses the solid state disk 14 through the first access path 204 and the second access path 208, data transmission is actually performed through the bottom layer of the hardware such as the media access controller (MAC) and the physical layer (PHY) (not illustrated).

In another embodiment, the disk access command 120 is completely processed by the driver program 100 which is executed by the processor 12. Under such a condition, the processor 12 accesses the storage circuit 20 only through the path C by using the driver program 100. The processing unit 200 only monitors and manages the circuit of the solid state disk 14 without processing the disk access command 120. In an embodiment, the processing unit 200 monitors and manages the circuit of the solid state disk 14 through, for example, a system control circuit 214 further included in the control circuit 22, but the present disclosure is not limited in this regard.

In some disk access technologies, only the processing unit 200 in the control circuit 22 of the solid state disk 14 is used to access the storage circuit 20 of the solid state disk 14. When the storage amount of the storage circuit 20 is large or when the address complexity of the storage circuit 20 is high, a more powerful processing unit or a larger number of processing units is required to accomplish a higher access speed. However, when such a method is used, the cost of the solid state disk 14 is greatly increased.

As a result, by writing the second device memory address in the second base address register 206 and by establishing the second access path 208, the processor 12 can execute the driver program 100 to process the disk access command 120 to access the storage circuit 20 of the solid state disk 14. The load of the access operation of the storage circuit 20 can be shared by the processor 12 or can even be fully taken on by the processor 12. As a result, the processing unit 200 can be responsible only for system monitoring. The cost of the solid state disk 14 is thus greatly reduced and the efficiency of the solid state disk 14 is increased.

In an embodiment, the control circuit 22 further includes a memory control circuit 216 electrically coupled to the disk bus 210. The processor 12 can execute the driver program 100 to control the memory control circuit 216 to store a data-to-be-written 124 to a cache block of the memory 10 in FIG. 1 through the system bus 16, the second access path 208 and the disk bus 210 to extend the life of the solid state disk 14.

In some technologies, the memory control circuit 216 is coupled to the dynamic random access memory (not illustrated) of the system to provide the cache mechanism mentioned above. Since in the present invention, the driver program 100 is executed by the processor 12, the processor 12 can directly require the cache block from the memory 10 to store the data temporarily. The efficiency can be greatly increased as a result.

Figure 3:
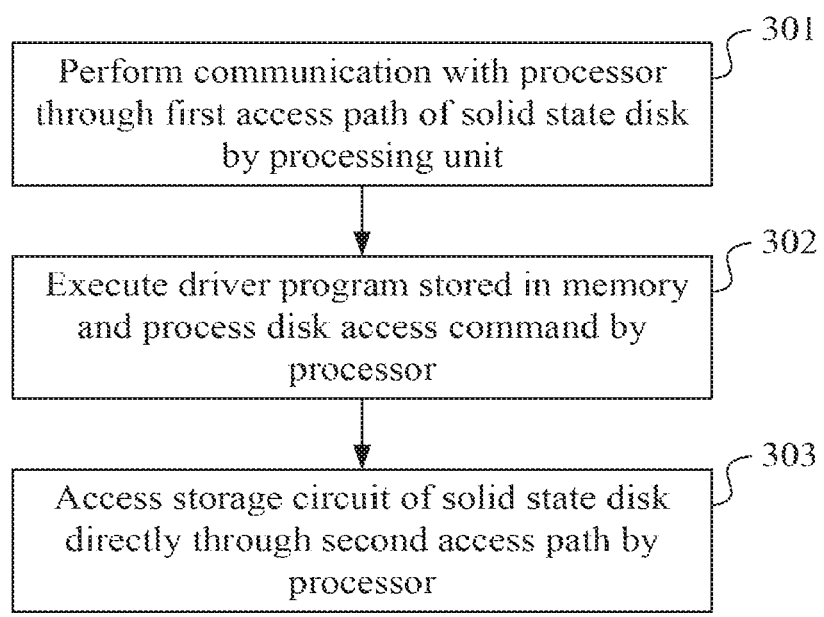
FIG. 3 is a flow chart of a method for direct disk accessing in an embodiment of the present disclosure.

Reference is now made to FIG. 3. FIG. 3 is a flow chart of a method 300 for direct disk accessing in an embodiment of the present disclosure. The method 300 can be used in, for example, the computing system 1 illustrated in FIG. 1, but the present disclosure is not limited in this regard. The method 300 includes the steps outlined below.

In step 301, communication is performed with the processor 12 through the first access path 204 of the solid state disk 14 by the processing unit 200 of the solid state disk 14. The first access path 204 corresponds to the first base address register 202.

In step 302, the driver program 100 stored in the memory 10 is executed and the disk access command 120 is processed by the processor 12.

In step 303, the storage circuit 20 of the solid state disk 14 is accessed directly through the second access path 208 by the processor 12. The second access path 208 corresponds to the second base address register 206.

The steps are not necessarily recited in the sequence in which the steps are performed. That is, unless the sequence of the steps is expressly indicated, the sequence of the steps is interchangeable, and all or part of the steps may be simultaneously, partially simultaneously, or sequentially performed.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A system comprising:
   a memory configured to store a driver program;
   a processor; and
   a solid-state storage disk comprising a storage circuit and a control circuit, wherein the control circuit comprises:
   a processing unit configured to communicate with the processor through a first access path, and to receive a first access command from the processor through the first access path to access the storage circuit of the storage circuit;
   wherein the processor is configured to execute the driver program that enables the processor to process a second access command for accessing the storage circuit of the storage circuit through a second access path,
   wherein the second access path does not pass through the processing unit of the storage circuit,
   wherein the processor executes the driver program stored in the memory so that the processor acts as a virtual operation core to directly access the storage circuit of the storage circuit through the second access path.

2. The system of claim 1, wherein the control circuit further comprises:
   a first base address register (BAR) configured to store a first memory address, wherein the first access path corresponds to the first base address register; and
   a second base address register configured to store a second memory address, wherein the second access path corresponds to the second base address register.

3. The system of claim 1, wherein the processor and the processing unit simultaneously or partially simultaneously access the storage circuit through the first access path and the second access path, respectively.

4. The system of claim 1, wherein when the processor processes the second access command to access the storage circuit, and the processing unit monitors and manages the storage circuit.

5. The system of claim 1, wherein the control circuit further comprises a storage control circuit, and the processor accesses the storage circuit through the second access path and the storage control circuit.

6. The system of claim 1, wherein the control circuit further comprises a memory control circuit, and the processor is configured to execute the driver program to control the memory control circuit through the second access path to store a data to a cache block of the memory.

7. The system of claim 1, wherein the storage circuit and the processor are coupled through a peripheral component interconnect express (PCIe) interface.

8. The system of claim 1, wherein at least one of the first access path and the second access path is a direct memory access (DMA) path.

9. A method for accessing a storage circuit of a solid-state disk, the method comprising:
   performing, by a processing unit of the solid-state disk, communication with a processor through a first access path of the solid-state disk;
   receiving, by the processing unit, a first access command from the processor through the first access path to access the storage circuit; and
   accessing, by the processor and a driver program stored in a memory, the storage circuit of the solid-state disk through a second access path according to a second access command;
   wherein the second access path does not pass through the processing unit of the solid-state disk,
   wherein the processor executes the driver program stored in the memory so that the processor acts as a virtual operation core to directly access the storage circuit of the storage device through the second access path.

10. The method of claim 9, further comprising:
    storing a first memory address in a first base address register, wherein the first access path corresponds to the first base address register; and
    storing a second memory address in a second base address register, wherein the second access path corresponds to the second base address register.

11. The method of claim 9, wherein the processor and the processing unit at least partially simultaneously access the storage circuit through the first access path and the second access path, respectively.

12. The method of claim 9, further comprising:
    processing the second access command by the processor to access the storage circuit; and
    monitoring and managing the storage circuit by the processing unit.

13. The method of claim 9, wherein the control circuit further comprises a storage control circuit, and the method further comprises:

accessing the storage circuit through the second access path and the storage control circuit by the processor.

14. The method of claim 9, wherein the control circuit further comprises a memory control circuit, and the method further comprises:

executing the driver program by the processor to control the memory control circuit through the second access path to store a data to a cache block of the memory.

15. The method of claim 9, wherein the storage device and the processor are coupled through a peripheral component interconnect express (PCIe) interface.

16. The method of claim 9, wherein each of the first access path and the second access path is a direct memory access path.

* * * * *